(12) United States Patent
Zhu

(10) Patent No.: US 12,184,108 B1
(45) Date of Patent: Dec. 31, 2024

(54) ENERGY STORAGE POWER SUPPLY

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 18/520,161

(22) Filed: Nov. 27, 2023

(30) Foreign Application Priority Data

Nov. 10, 2023 (CN) .......................... 202323055599.2

(51) Int. Cl.
| | | |
|---|---|---|
| *H02J 7/00* | (2006.01) | |
| *F21L 4/08* | (2006.01) | |
| *F21V 1/06* | (2006.01) | |
| *F21V 5/04* | (2006.01) | |

(52) U.S. Cl.
CPC .............. *H02J 7/0063* (2013.01); *F21L 4/08* (2013.01); *F21V 1/06* (2013.01); *F21V 5/04* (2013.01); *H02J 7/0029* (2013.01); *H02J 7/0047* (2013.01)

(58) Field of Classification Search
CPC ........ H02J 7/0047; H02J 7/0068; H02J 9/062; H02J 7/0042; H02J 9/061; H02J 7/00032; G09G 3/20; H02M 1/088; H02M 3/155; H02M 7/5387; H01R 25/006; H01R 31/02; H05K 5/0021; H05K 5/023; B65H 75/40; B65H 75/4471; B65H 2701/34; B25H 3/02

See application file for complete search history.

(56) References Cited

U.S. PATENT DOCUMENTS

| | | | | |
|---|---|---|---|---|
| D371,356 | S * | 7/1996 | Maruyama | D14/129 |
| 7,800,252 | B2 * | 9/2010 | DuBose | H02J 9/005 |
| | | | | 307/126 |
| D625,446 | S * | 10/2010 | He | D26/38 |
| 11,156,330 | B2 * | 10/2021 | Grandadam | F21V 17/12 |
| D957,722 | S * | 7/2022 | Zhao | D26/124 |
| 2008/0164768 | A1 * | 7/2008 | Litwack | H05B 47/16 |
| | | | | 307/116 |
| 2014/0098525 | A1 * | 4/2014 | Bennett | H02J 7/0045 |
| | | | | 320/135 |
| 2014/0240969 | A1 * | 8/2014 | Chen | F21V 14/065 |
| | | | | 362/187 |
| 2020/0185670 | A1 * | 6/2020 | Hiratsuka | H01M 10/6563 |
| 2022/0200303 | A1 * | 6/2022 | Swamy | H02J 7/0013 |

FOREIGN PATENT DOCUMENTS

TW          M441797 U   * 11/2012

* cited by examiner

*Primary Examiner* — Quan Tra

(57) ABSTRACT

The present disclosure provides an energy storage power supply. The energy storage power supply includes a shell and a lighting device. The shell is provided with a lighting chamber. The lighting chamber is provided with a first light outlet. The lighting device includes a light-emitting component and a condensing lens. The lighting device is arranged in the lighting chamber. A light-emitting surface of the light-emitting component is arranged in a manner of facing the condensing lens and the first light outlet. The condensing lens is configured to condense light emitted by the light-emitting component to form a small light beam with a long illumination distance. Through the above structure, when a user uses the energy storage power supply in the open air or other occasions, purposes of a longer illumination distance and a clearer viewing field, which greatly improves the practicality and user experience of the energy storage power supply.

4 Claims, 13 Drawing Sheets

ENERGY STORAGE POWER SUPPLY

CROSS-REFERENCE TO RELATED APPLICATIONS

The application claims priority of Chinese patent application CN2023230555992, filed on 10 Nov. 2023, which is incorporated herein by reference in its entireties.

TECHNICAL FIELD

The present disclosure relates to the technical field of energy storage power supplies, and in particular, to an energy storage power supply.

BACKGROUND

At present, with the continuous progress of society and scientific technology, electricity use is increasingly popular. Furthermore, as the enthusiasm for outdoor exploration continues to increase, people have a high demand for electricity in outdoor camping. At this time, the emergence of energy storage power supplies can meet various needs for outdoor electricity use.

The existing energy storage power supplies will usually have a lighting function, but in an environment with weak light or when long-distance illumination is required, a lighting effect of the general energy storage power supplies is poor. Therefore, it is necessary to provide an energy storage power supply capable of emitting long-distance light beams and having a lighting function.

SUMMARY

In view of this, the present disclosure provides an energy storage power supply capable of emitting long-distance light beams.

The present disclosure provides an energy storage power supply, including:
  a shell, wherein the shell is provided with a lighting chamber, and the lighting chamber is provided with a first light outlet; and
  a lighting device, wherein the lighting device includes a light-emitting component and a condensing lens; the lighting device is arranged in the lighting chamber; a light-emitting surface of the light-emitting component is arranged in a manner of facing the condensing lens and the first light outlet; and the condensing lens is configured to condense light emitted by the light-emitting component to form a small light beam with a long illumination distance.

As the improvement of the present disclosure, the condensing lens is a convex lens.

As the improvement of the present disclosure, the lighting device further includes a lighting shell; the lighting shell is provided with a second light outlet and a connecting part located at the second light outlet; a groove is arranged at the first light outlet; a bottom surface of the connecting part is connected to a bottom surface of the groove, so that the lighting shell is sleeved in the lighting chamber; and the condensing lens is located in front of the connecting part and is located in the groove.

As the improvement of the present disclosure, the shell is provided with a chamber cover body; the chamber cover body is connected to the shell to stop the lighting shell and the condensing lens in the lighting chamber; the chamber cover body is provided with a light passing port; and the light passing port is communicated to the first light outlet and the second light outlet.

As the improvement of the present disclosure, the chamber cover body is provided with at least one buckle; the shell is provided with at least one buckle slot matched and connected with the buckle; and the buckle is connected to the buckle slot, so that the chamber cover body is buckled with the shell.

As the improvement of the present disclosure, the chamber cover body is provided with at least one screw mounting column, and the shell is provided with at least one screw hole matched with the screw mounting column. A screw can pass through the screw hole and be mounted in the screw mounting column to ensure that the chamber cover body is fixedly connected to the shell.

As the improvement of the present disclosure, the energy storage power supply further includes a driving circuit of the energy storage power supply; the driving circuit of the energy storage power supply includes a charging control circuit, a first direct current output circuit, an alternating current output circuit and a main control circuit, As the improvement of the present disclosure, the charging control circuit, configured to be electrically connected to an external power supply and a battery to receive an external voltage to charge the battery.

The first direct current output circuit electrically connected to the battery and configured to receive a voltage of the battery and output a first direct current voltage.

The alternating current output circuit electrically connected to the battery and configured to receive the voltage of the battery and output an alternating current supply voltage.

The main control circuit, electrically connected to the battery, the charging control circuit, the first direct current output circuit, and the alternating current output circuit and configured to: control operations of the charging control circuit, the first direct current output circuit, and the alternating current output circuit and detect at least one of the first direct current output circuit and the alternating current output circuit to obtain a load condition of at least one of the first direct current output circuit and the alternating current output circuit, wherein when a duration at which at least one of the first direct current output circuit and the alternating current output circuit is in an unloaded state exceeds a preset time value, the main control circuit controls at least one of the first direct current output circuit and the alternating current output circuit to be turned off.

As the improvement of the present disclosure, the main control circuit is configured to detect the first direct current output circuit and the alternating current output circuit to obtain a load condition of the first direct current output circuit and a load condition of the alternating current output circuit; the preset time value includes a first preset time value; when a duration at which the alternating current output circuit is in an unloaded state exceeds the first preset time value, the main control circuit controls the alternating current output circuit to be turned off; the preset time value includes a second preset time value; and when a duration at which the first direct current output circuit is in an unloaded state exceeds the second preset time value, the main control circuit controls the first direct current output circuit to be turned off.

As the improvement of the present disclosure, the driving circuit of the energy storage power supply further includes a second direct current output circuit; the second direct current output circuit is electrically connected to the battery and configured to: receive the voltage of the battery and output a second direct current voltage; the first direct current voltage is different from the second direct current voltage; the main control circuit is further configured to: control an operation of the second direct current output circuit and detect the second direct current output circuit to obtain a load condition of the second direct current output circuit; and when a duration at the second direct current output circuit in an unloaded state exceeds a third preset time value, the main control circuit controls the second direct current output circuit to be turned off;

the alternating current output circuit is configured to: receive the voltage of the battery and convert the voltage of the battery into the alternating current output voltage; the first direct current output circuit is configured to: receive the voltage of the battery and convert the voltage of the battery into the first direct current voltage; the second direct current output circuit is configured to receive the voltage of the battery and convert the voltage of the battery into the second direct current voltage;

the alternating current output circuit includes an alternating current conversion module and an alternating current output port; the alternating current conversion module is configured to: receive the voltage of the battery and output the alternating current supply voltage; the alternating current output port is configured to output the alternating current supply voltage; the alternating current supply voltage is 110 V or 220 V; the first direct current output circuit includes a first direct current conversion module and a first direct current output port; the first direct current conversion module is configured to convert the voltage of the battery into the first direct current voltage; the first direct current output port is configured to output the first direct current voltage; the first direct current voltage is 5 V; the first direct current output port is a USB port; the second direct current output circuit includes a second direct current conversion module and a second direct current output port; the second direct current conversion module is configured to convert the voltage of the battery into the second direct current voltage; the second direct current output port is configured to output the second direct current voltage; and the second direct current voltage is 12 V.

As the improvement of the present disclosure, the driving circuit of the energy storage power supply includes a first sampling circuit; the first sampling circuit is electrically connected to the main control circuit and the alternating current output circuit; the main control circuit detects the alternating current output circuit through the first sampling circuit and obtains a first sampled signal; the main control circuit obtains output power of the alternating current output circuit according to the first sampled signal; when the output power of the alternating current output circuit is less than a first preset power value, the alternating current output circuit is in the unloaded state; when the duration of the unloaded state exceeds the first preset time value, the alternating current output circuit is controlled to be turned off.

As the improvement of the present disclosure, the driving circuit of the energy storage power supply includes a second sampling circuit; the second sampling circuit is electrically connected to the main control circuit and the first direct current output circuit; the main control circuit detects the first direct current output circuit through the second sampling circuit and obtains a second sampled signal; the main control circuit obtains output power of the first direct current output circuit according to the second sampled signal; when the output power of the first direct current output circuit is less than a second preset power value, the first direct current output circuit is in the unloaded state; when the duration of the unloaded state exceeds the second preset time value, the first direct current output circuit is controlled to be turned off.

As the improvement of the present disclosure, the driving circuit of the energy storage power supply includes a third sampling circuit; the third sampling circuit is electrically connected to the main control circuit and the second direct current output circuit; the main control circuit detects the second direct current output circuit through the third sampling circuit and obtains a third sampled signal; the main control circuit obtains output power of the second direct current output circuit according to the third sampled signal; when the output power of the second direct current output circuit is less than a third preset power value, the second direct current output circuit is in the unloaded state; and when the duration of the unloaded state exceeds the third preset time value, the second direct current output circuit is controlled to be turned off.

As the improvement of the present disclosure, a quantity of the first direct current output port is multiple; a quantity of the second sampling circuit corresponds to the quantity of first direct current output port; each of the second sampling circuits is connected between the corresponding first direct current output port and the main control circuit; the main control circuit is configured to detect the load conditions of the plurality of first direct current output ports through the plurality of second sampling circuits; when any one of the first direct current output ports is in a loaded state, the main control circuit controls the first direct current output circuit to operate normally; and when all the first direct current output ports are in the unloaded state, the main control circuit controls the first direct current output circuit to be turned off.

As the improvement of the present disclosure, the first direct current output circuit further includes a first switch; the first switch includes a first control end, a first conducting end, and a first ground end; the main control circuit is electrically connected to the first control end; the first direct current conversion module and the first direct current output ports are all electrically connected to the first conducting end; the first ground end is electrically connected to a ground; the first switch is configured to control conversion of the first direct current conversion module and outputs of the first direct current output ports;

As the improvement of the present disclosure, the second sampling circuit includes a plurality of second sampling resistor groups; the main control circuit detects the first direct current output circuit and obtains the second sampled signal through the second sampling resistor groups; the main control circuit is configured to control, according to the detected second sampled signal, the first switch to be turned on or turned off.

As the improvement of the present disclosure, the second direct current output circuit includes a second switch; the second switch includes a second control end, a second conducting end, and a second ground end; the main control circuit is electrically connected to the second control end; the second direct current conversion module and the second direct current output port are both electrically connected to the second conducting end; the second ground end is electrically connected to the ground; the second switch is configured to control conversion of the second direct current conversion module and an output of the second direct current output port.

As the improvement of the present disclosure, the third sampling circuit includes a third sampling resistor group; the main control circuit detects the second direct current output circuit and obtains the third sampled signal through the third sampling resistor group; the main control circuit is configured to control, according to the detected third sampled signal, the second switch to be turned on or turned off.

the alternating current output circuit further includes a third switch; the third switch includes a first control end, a third conducting end, and a third ground end; the main control circuit is electrically connected to the third control end; the alternating current conversion module and the alternating current output port are both electrically connected to the third conducting end; the third ground end is electrically connected to the ground; the third switch is configured to control conversion of the alternating current conversion module and an output of the alternating current output port;

As the improvement of the present disclosure, the first sampling circuit includes a first sampling resistor group; the main control circuit detects the alternating current output circuit and obtains the first sampled signal through the first sampling resistor group; and the main control circuit is configured to control, according to the detected first sampled signal, the third switch to be turned on or turned off.

As the improvement of the present disclosure, the charging control circuit includes a first charging port, a first charging detection module, a second charging port, a second charging detection module, and a charging control module; the external voltage includes a first external voltage and a second external voltage; the first charging port is configured to receive the first external voltage; the first charging detection module is connected between the first charging port and the charging control module; the second charging port is configured to receive the second external voltage; the second charging detection module is connected between the second charging port and the charging control module; the charging control module is electrically connected to the main control circuit and the battery to charge the battery through the first external voltage or the second direct current voltage; the first charging port is a direct current charging port; the first external voltage is 12 V; the second charging port is a Type-C charging port; and the second external voltage is 5 V.

As the improvement of the present disclosure, the driving circuit of the energy storage power supply further includes a lighting module; the lighting module is electrically connected to the main control circuit and is configured to emit lighting light under the control of the main control circuit; the driving circuit of the energy storage power supply further includes an on/off control module; the on/off control module is electrically connected to the main control circuit and is operated by a user to control on and off states of the driving circuit, the lighting module, the direct current output circuits, the alternating current output circuit, and the like; the driving circuit of the energy storage power supply further includes an indication module; the indication module is electrically connected to the main control circuit and is configured to send an indication signal under the control of the main control circuit to indicate working conditions of the charging control module, the lighting module, the direct current output circuits, and the alternating current output circuit; the driving circuit of the energy storage power supply further includes a protection module; the protection module is electrically connected to the main control circuit and is configured to: detect a working state of the driving circuit and output a detected signal to the main control circuit; and the main control circuit analyzes, according to the detection signal, whether the driving circuit is in an abnormal working state and controls, when the driving circuit is in the abnormal working state, the driving circuit to be turned off.

As the improvement of the present disclosure, the lighting module includes a fourth switch, a lighting conversion module, and the lighting device; the fourth switch includes a fourth control end, a fourth conducting end, and a fourth ground end; the main control circuit is electrically connected to the fourth control end; the lighting conversion module and the lighting device are both electrically connected to the fourth conducting end; the fourth ground end is electrically connected to the ground; the fourth switch is configured to control conversion of the lighting conversion module and lighting of the lighting device.

As the improvement of the present disclosure, the on/off control module includes a first button, a second button, a third button, a fourth button, a fifth button, and a sixth button; the first button is configured to control on and off states of the driving circuit; the second button is configured to control on and off states of the first direct current output circuit; the third button is configured to control on and off states of the second direct current output circuit; the fourth button is configured to control on and off states of the alternating current output circuit; the fifth button is configured to control on and off states of the lighting module; and the sixth button is configured to control on and off states of the charging control circuit.

As the improvement of the present disclosure, the energy storage power supply further includes the battery, wherein the battery is electrically connected to the driving circuit and the lighting device; and the battery is configured to supply power to the driving circuit and the lighting device.

Compared with the prior art, an energy storage power supply includes a shell, wherein the shell is provided with a lighting chamber, and the lighting chamber is provided with a first light outlet; and a lighting device, wherein the lighting device includes a light-emitting component and a condensing lens; the lighting device is arranged in the lighting chamber; a light-emitting surface of the light-emitting component is arranged in a manner of facing the condensing lens and the first light outlet; and the condensing lens is configured to condense light emitted by the light-emitting component to form a small light beam with a long illumination distance. Through the above structure, the energy storage power supply is provided with the lighting device, and the condensing lens is arranged in front of the light-emitting component. Due to the light condensing effect of the condensing lens, the energy storage power supply can emit the long-distance small light beam, so that when a user uses the energy storage power supply in the open air or other occasions, purposes of a longer illumination distance and a clearer viewing field, which greatly improves the practicality and user experience of the energy storage power supply.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

The terms "first", "second" and "third" in the specification and claim of the present disclosure and the attached drawings are used to distinguish different objects rather than to describe a specific sequence. Furthermore, the term "includes", and any variation thereof, is intended to cover non-exclusive inclusion. For example, a process, method, system, product or device comprising a series of steps or units is not limited to the listed steps or units, but optionally also includes steps or units not listed, or optionally includes other steps or units inherent to those processes, methods, products or devices.

Figure 1:
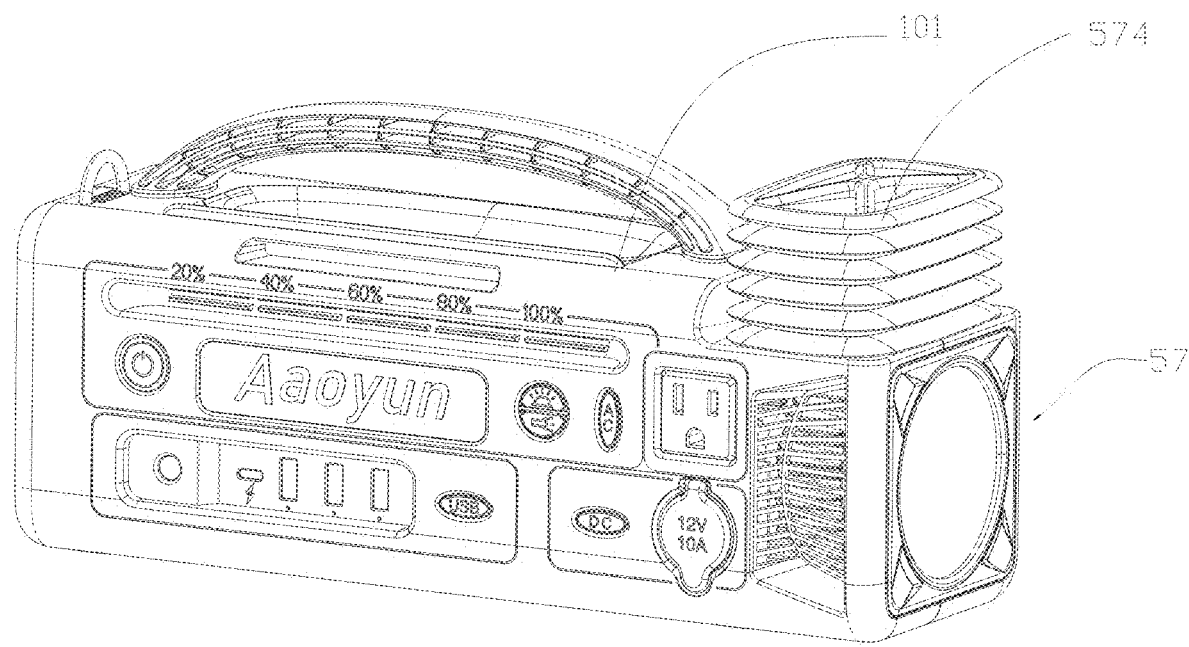
FIG. 1 is an overall structural diagram of an energy storage power supply according to the present disclosure.
Figure 2:
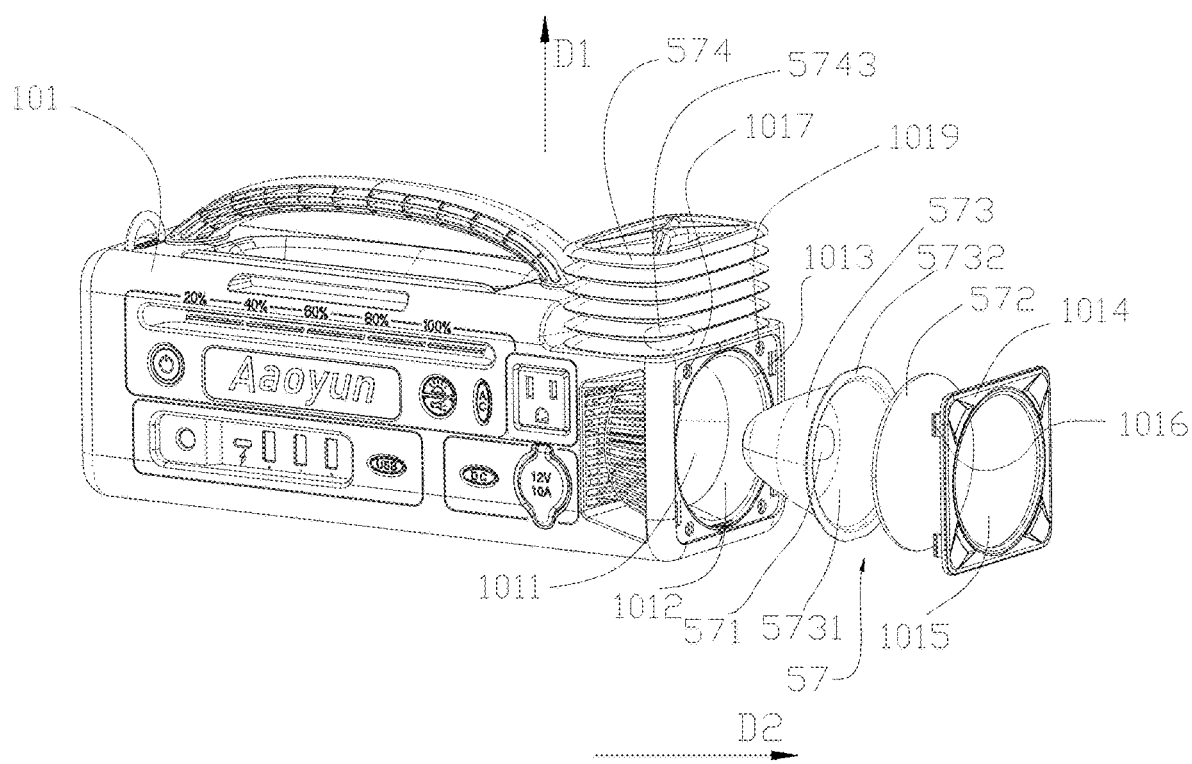
FIG. 2 is an exploded view of a lighting device according to the present disclosure.
Figure 3:
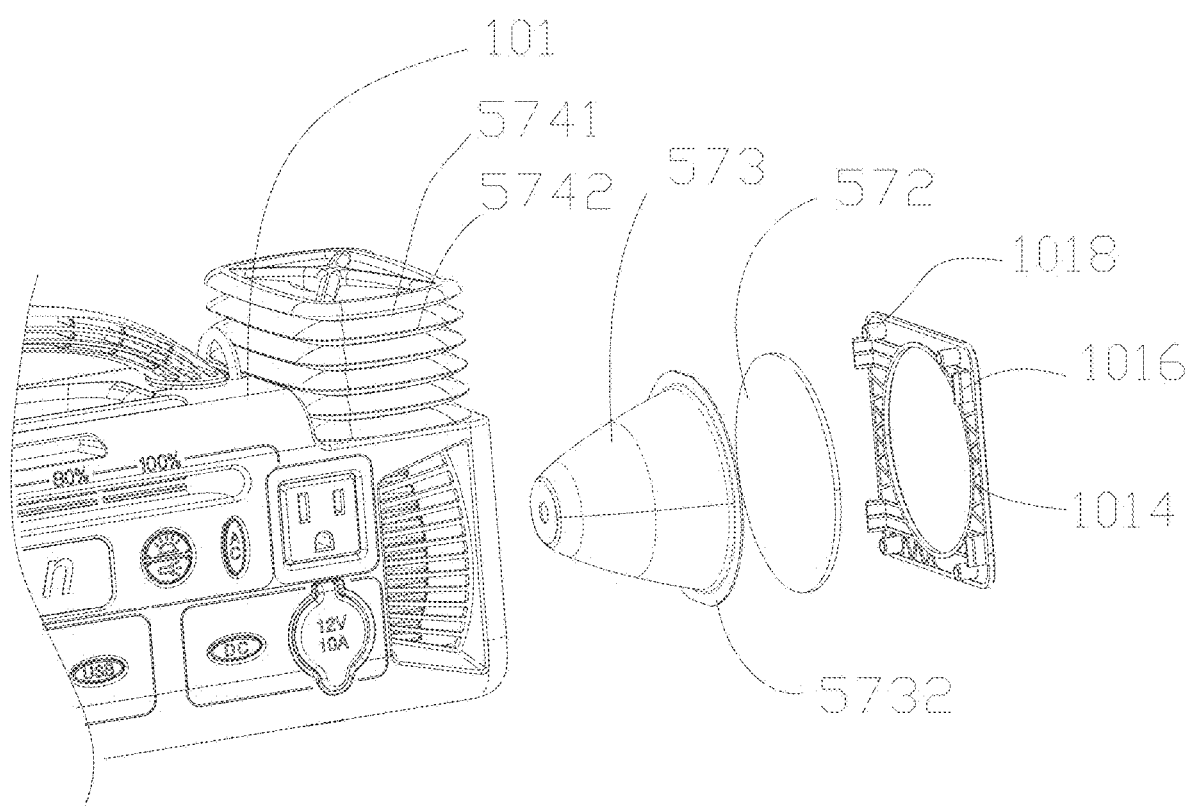
FIG. 3 is another exploded view of a lighting device according to the present disclosure.
Figure 4:
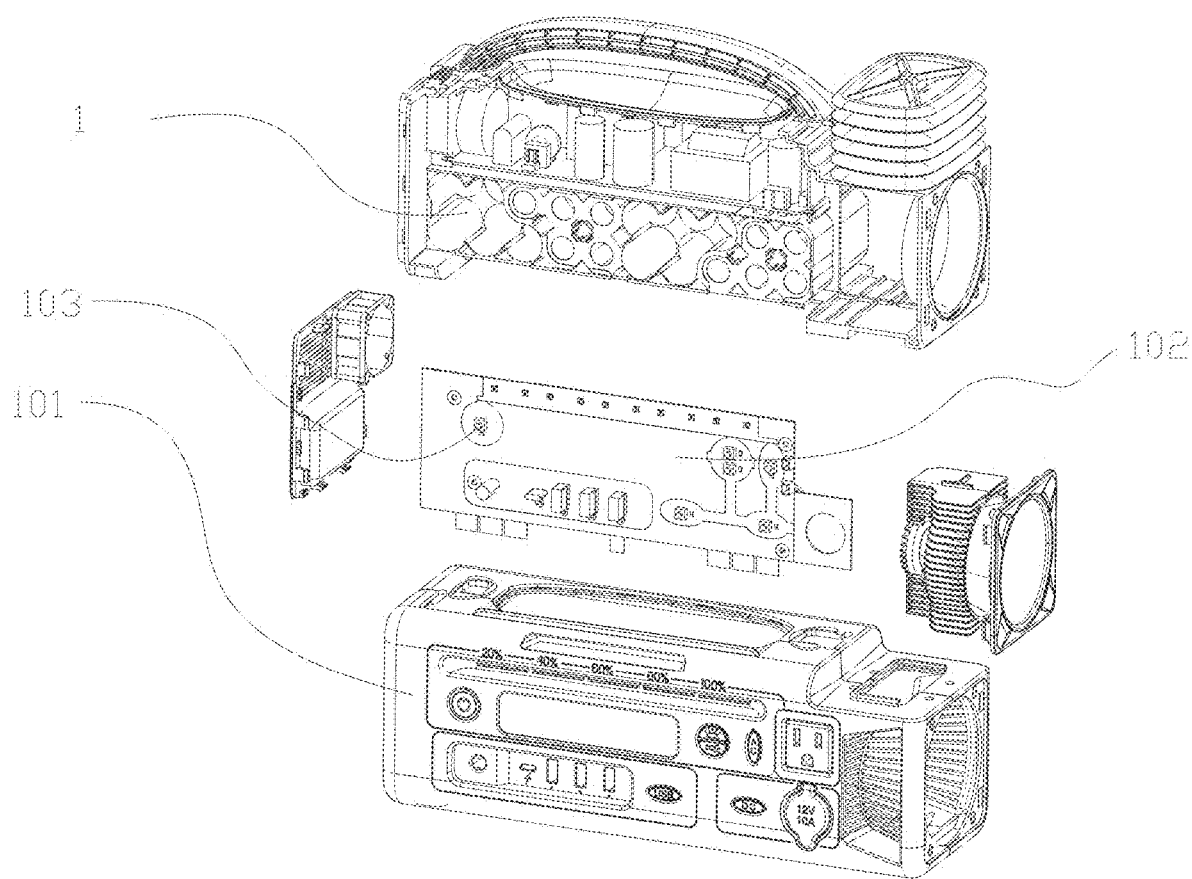
FIG. 4 is an exploded view of an energy storage power supply according to the present disclosure.
Figure 5:
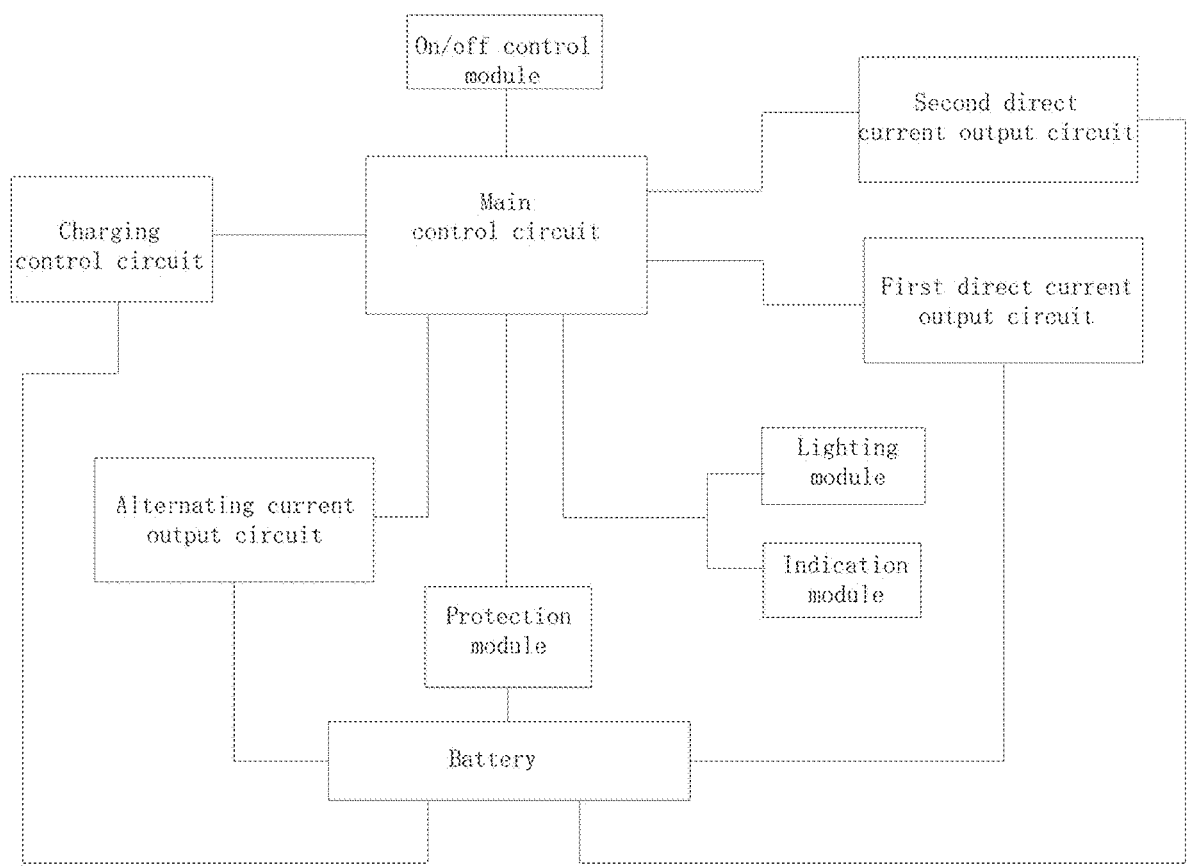
FIG. 5 is a system block diagram according to the present disclosure.
Figure 6:
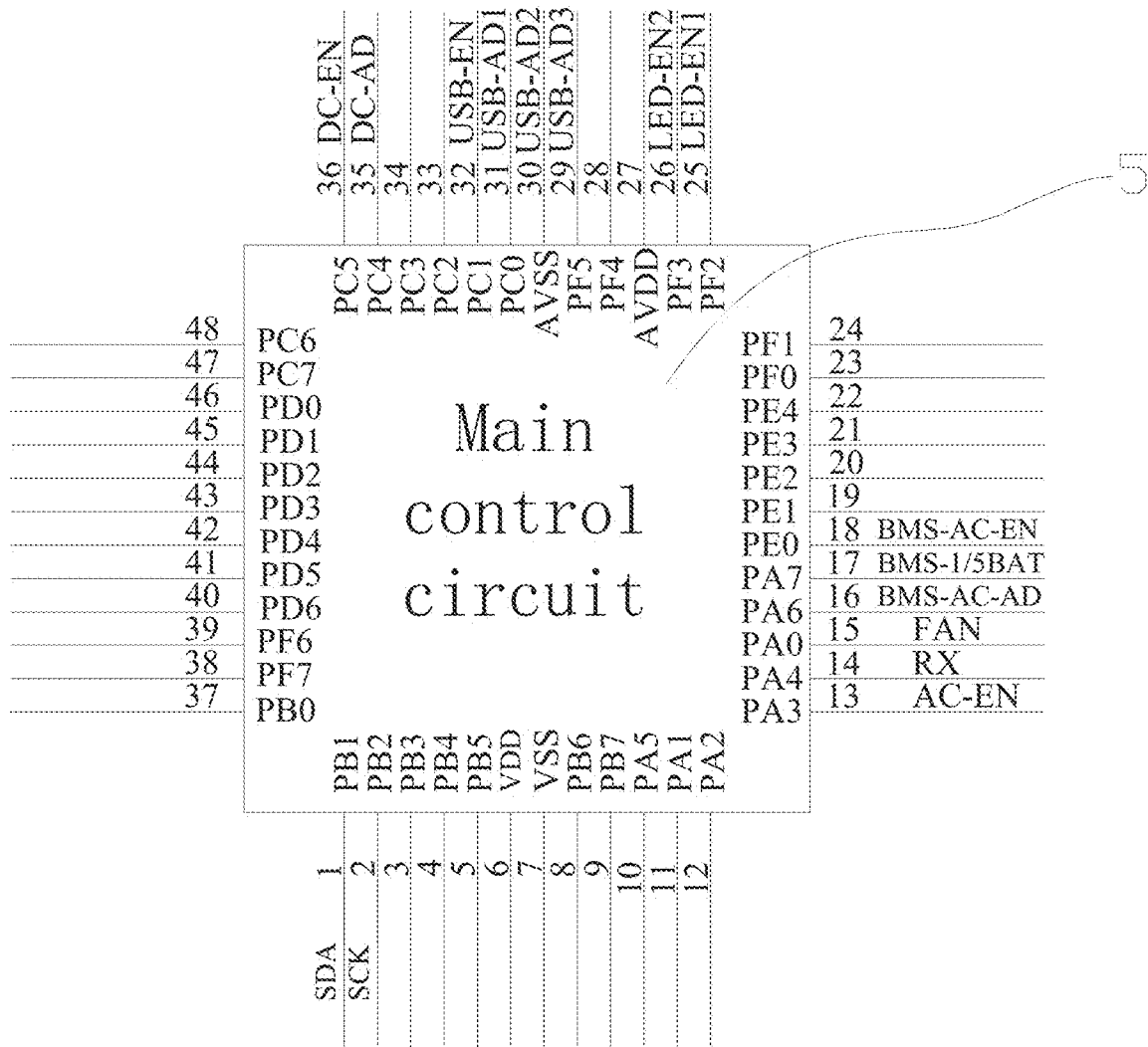
FIG. 6 is an overall circuit diagram according to the present disclosure.
Figure 7:
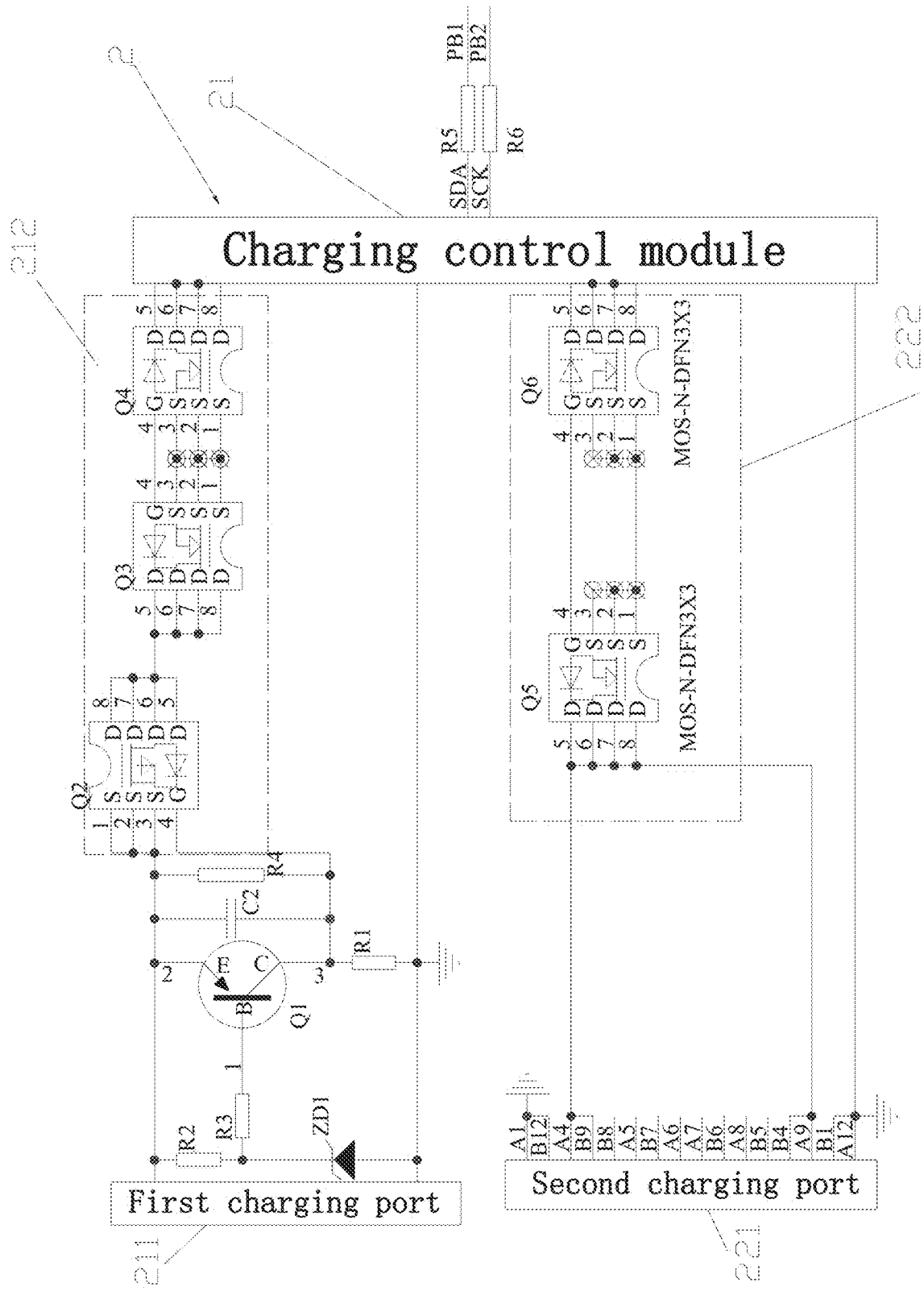
FIG. 7 is a circuit diagram of a charging control circuit according to the present disclosure.
Figure 8:
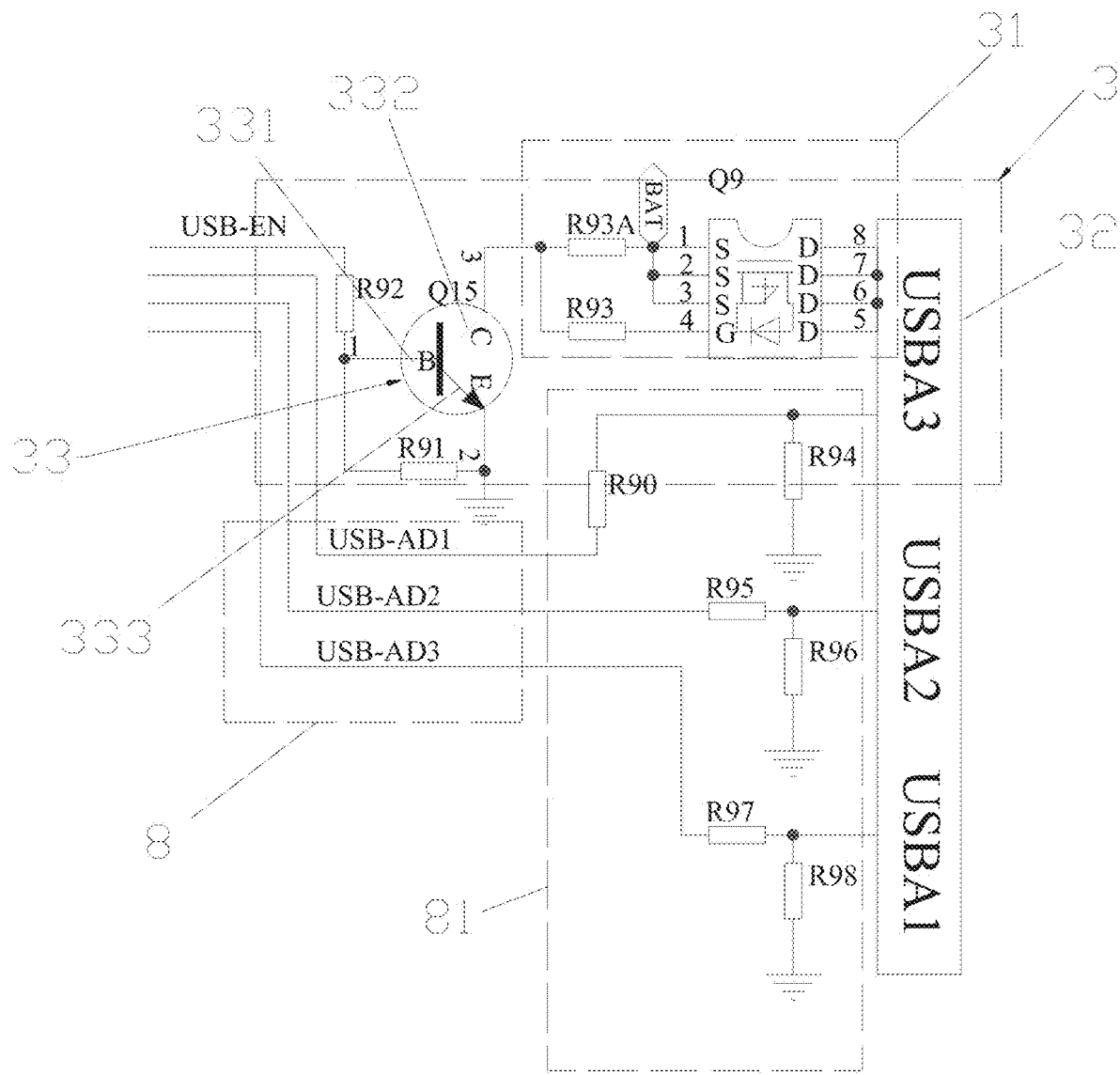
FIG. 8 is a circuit diagram of a first direct current output circuit according to the present disclosure.
Figure 9:
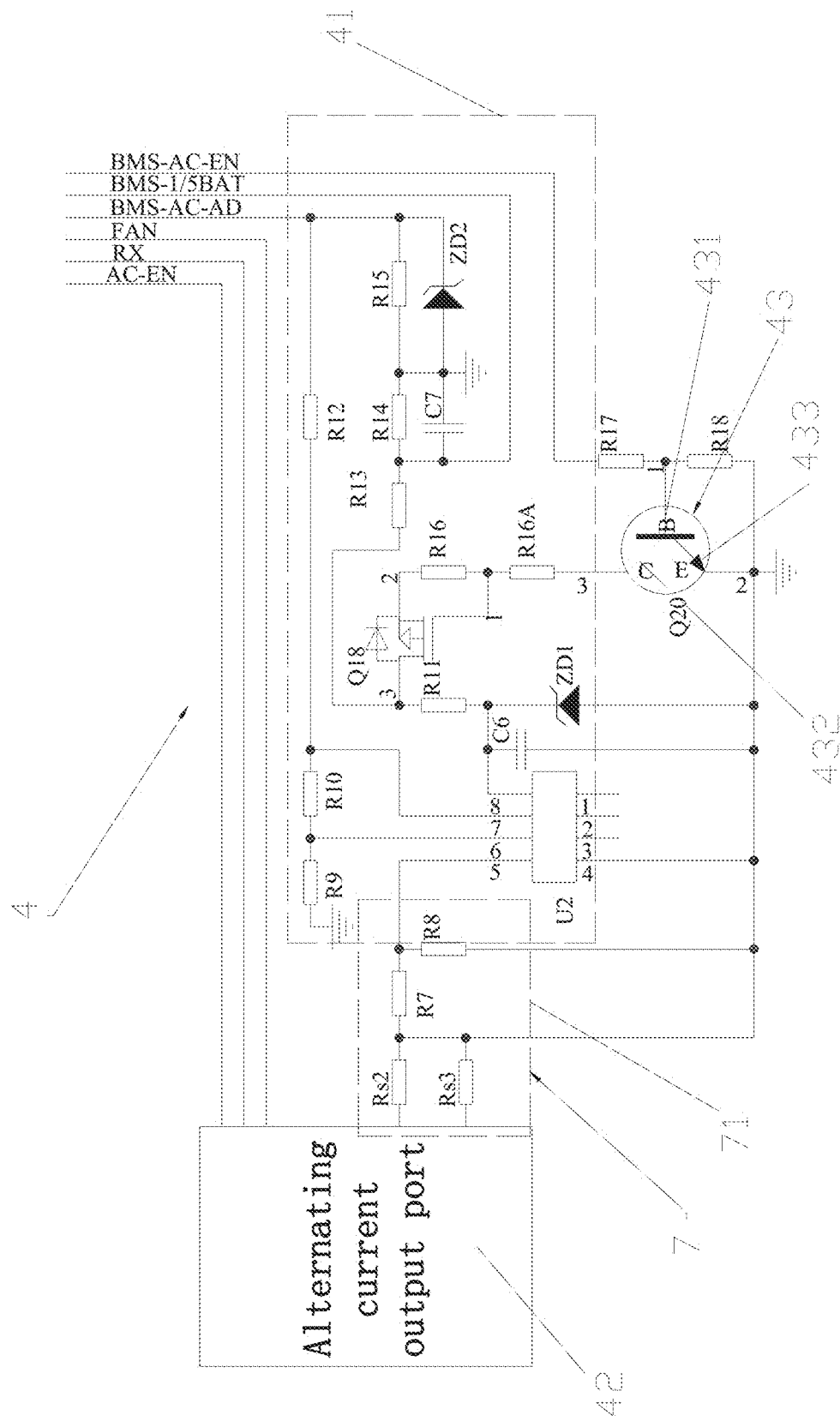
FIG. 9 is a circuit diagram of an alternating current output circuit according to the present disclosure.
Figure 10:
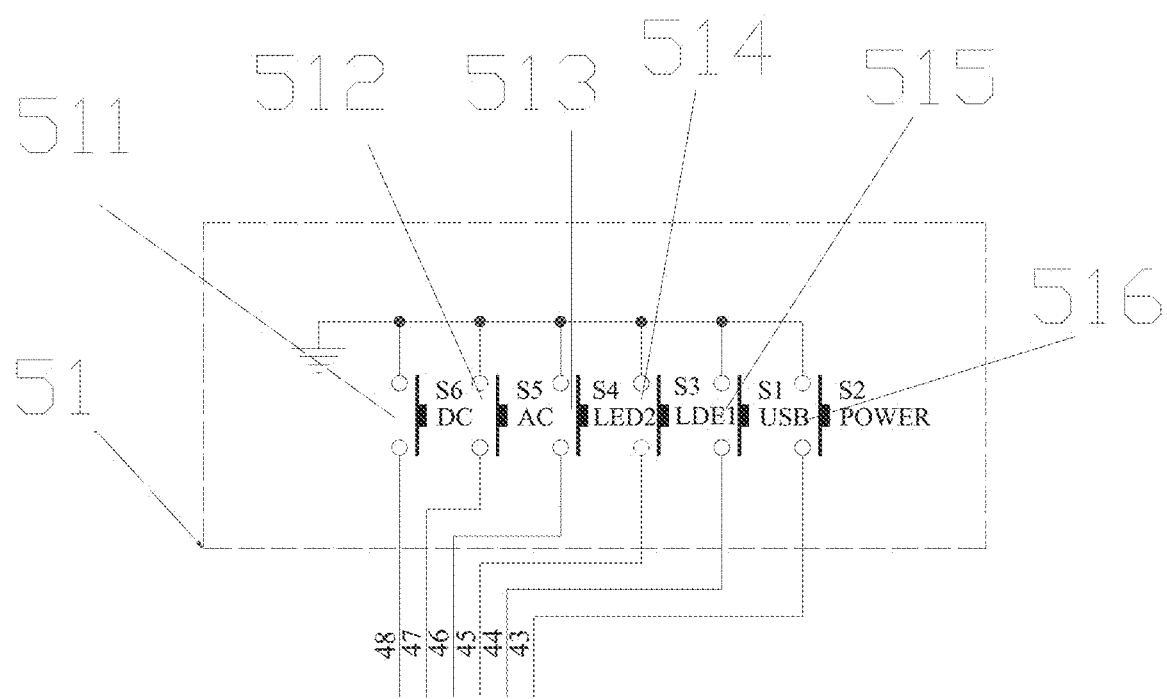
FIG. 10 is a circuit diagram of a switch control module according to the present disclosure.
Figure 11:
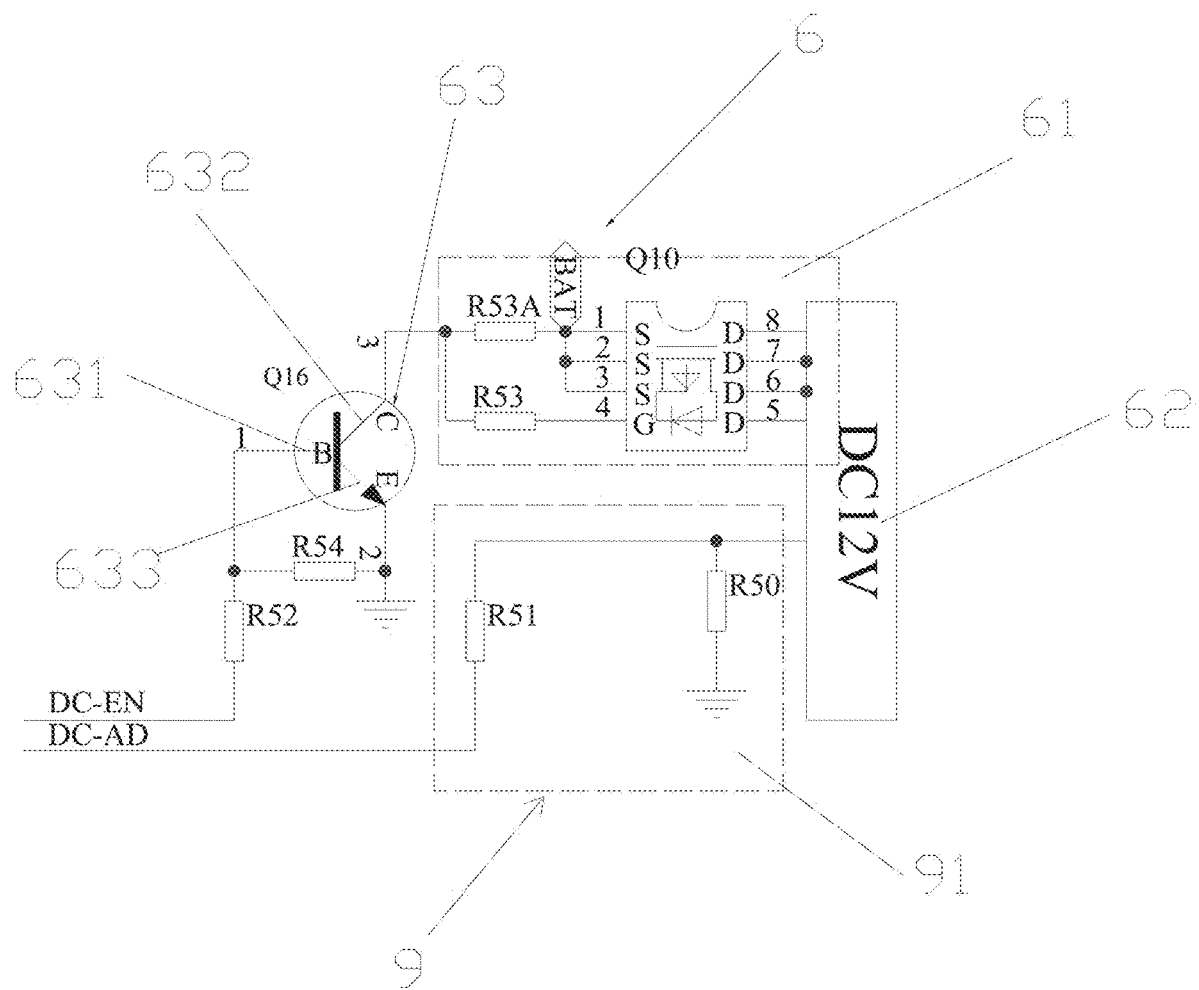
FIG. 11 is a circuit diagram of a second direct current output circuit according to the present disclosure.
Figure 12:
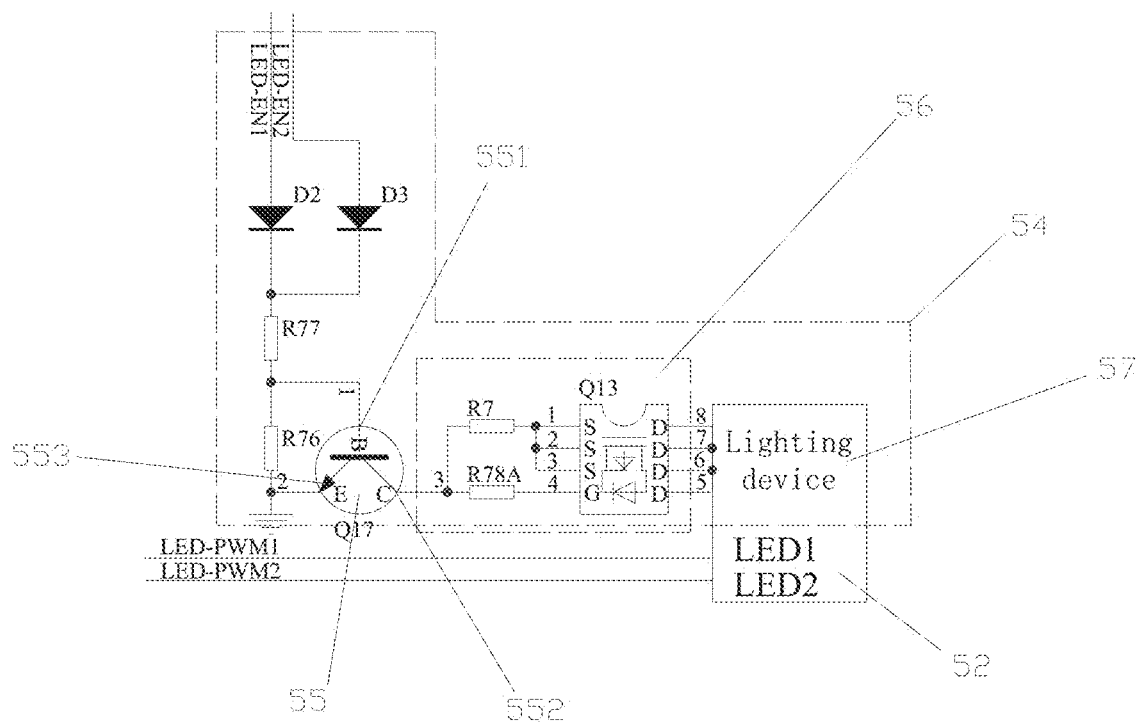
FIG. 12 is a circuit diagram of a lighting module of a driving circuit according to the present disclosure.
Figure 13:
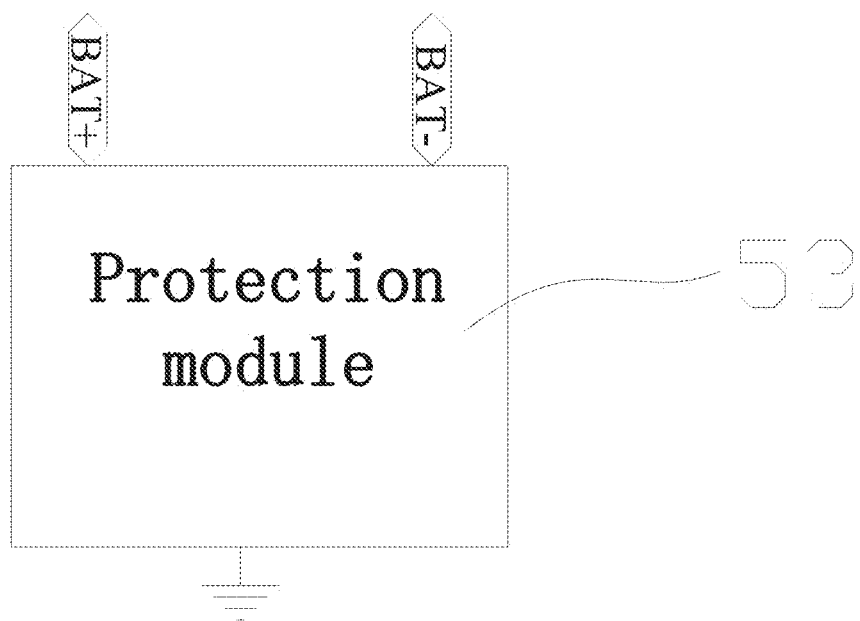
FIG. 13 is a circuit diagram of a protection module of a driving circuit according to the present disclosure.

Referring to FIG. 1 to FIG. 13, an energy storage power supply includes a shell 101, wherein the shell 101 is provided with a lighting chamber 1011, and the lighting chamber 1011 is provided with a first light outlet 1012; and a lighting device 57, wherein the lighting device 57 includes a light-emitting component 571 and a condensing lens 572; the lighting device 57 is arranged in the lighting chamber 1011; a light-emitting surface of the light-emitting component 571 is arranged in a manner of facing the condensing lens 572 and the first light outlet 1012; and the condensing lens 572 is configured to condense light emitted by the light-emitting component 571 to form a small light beam with a long illumination distance. The light-emitting component can be a light-emitting diode (LED) lamp. Through the above structure, the energy storage power supply is provided with the lighting device, and the condensing lens is arranged in front of the light-emitting component. Due to the light condensing effect of the condensing lens, the energy storage power supply can emit the long-distance small light beam, so that when a user uses the energy storage power supply in the open air or other occasions, purposes of a longer illumination distance and a clearer viewing field, which greatly improves the practicality and user experience of the energy storage power supply.

In this embodiment, the condensing lens 572 is a convex lens. Due to the condensing effect of the convex lens itself, the light emitted by the light-emitting component is condensed into the small light beam when passing through the convex lens, thus achieving long-distance illumination.

In this embodiment, the lighting device 57 further includes a lighting shell 573; the lighting shell 573 sis provided with a second light outlet 5731 and a connecting part 5732 located at the second light outlet 5731; a groove 1013 is arranged at the first light outlet 1012; a bottom surface of the connecting part 5732 is connected to a bottom surface of the groove 1013, so that the lighting shell 573 is sleeved in the lighting chamber 1011; and the condensing lens 572 is located in front of the connecting part 5732 and is located in the groove 1013. Through the above structure, a placement position of the condensing lens 572 effectively enables the light emitted by the light-emitting component to pass through the condensing lens 572 and be emitted from the first light outlet 1012 and the second light outlet 5731, thereby achieving the long-distance illumination effect.

In this embodiment, the shell 101 is provided with a chamber cover body 1014; the chamber cover body 1014 is connected to the shell 101 to stop the lighting shell 573 and the condensing lens 572 in the lighting chamber 1011; the chamber cover body 1014 is provided with a light passing port 1015; and the light passing port 1015 is communicated to the first light outlet 1012 and the second light outlet 5731. Through the above structure, the design of the chamber cover body 1014 can firmly mount the lighting device and stop it in the shell of the energy storage power supply, which ensures the safety of the lighting device.

In this embodiment, the chamber cover body 1014 is provided with at least one buckle 1016; the shell 101 is provided with at least one buckle slot 1017 matched and connected with the buckle 1016; and the buckle 1016 is connected to the buckle slot 1017, so that the chamber cover body 1014 is buckled with the shell 101. Through the above structure, the buckle structure can facilitate removal of the chamber cover body 1014 from the shell 101 and facilitate removal and replacement of the lighting device at any time in case of a damage.

In this embodiment, the chamber cover body 1014 is provided with at least one screw mounting column 1018, and the shell 101 is provided with at least one screw hole 1019 matched with the screw mounting column 1018. A screw can pass through the screw hole 1019 and be mounted in the screw mounting column 1018 to ensure that the chamber cover body 1014 is fixedly connected to the shell 101. Through the above structure, the connection between the chamber cover body 1014 and the shell 101 is more secure and stable, ensuring the safety of the lighting device.

In this embodiment, the shell 101 is further provided with a light-transmitting lampshade 574 and a night lamp; the lampshade 574 is foldable; and the night lamp is arranged in the lampshade 574. The lampshade 574 is connected to the shell 101 and disposed on the light chamber 1011. The lampshade 574 is able to be expanded to an unfolded state along a first direction D1. The first direction D1 is a direction from the lighting chamber to the lampshade, and the light beam is along a second direction D2 different from the first direction D1. The second direction D2 is a direction from a middle of the shell 101 to the lighting chamber 1011, and is also a direction from the lighting chamber 1011 to the first light outlet 1012. The lampshade 574 has a wavy longitudinal cross section along the first direction D1, and the lampshade 574 is foldable at a wave peak 5741 and a wave trough 5742 of a waveform. Through the above structure, the foldability of the wave peak and the wave trough of the lampshade achieve a folding function of the lampshade. When the lampshade is in a retractable state, the brightness of the night lamp can be adjusted. Moreover, due to the foldability of the lampshade, when the user needs to store the energy storage power supply, the lampshade can be folded to a folded state to reduce a volume of the energy storage power supply and facilitate the storage by the user.

In this embodiment, the energy storage power supply includes a driving circuit of the energy storage power supply and a battery 1. The driving circuit includes a charging control circuit 2, a first direct current output circuit 3, an alternating current output circuit 4, and a main control circuit 5. It can be understood that the energy storage power supply can be a portable energy storage (PES), such as an "outdoor mobile power supply", which is used as a backup power supply or an emergency power supply and can include a shell 101, a battery 1 arranged in the shell, and at least one circuit board 102. The driving circuit can be at least partially arranged on at least one circuit board 102, and the shell 101 can be provided with input and output port devices, an on-off button 103, and the like that are electrically connected to the driving circuit.

In this embodiment, the battery 1 is configured to output a voltage of the battery 1. The charging control circuit 2 is configured to be electrically connected to an external power supply and the battery 1 to receive an external voltage to charge the battery 1. The first direct current output circuit 3 is electrically connected to the battery 1 and is configured to receive the voltage of the battery 1 and output a first direct current voltage. The alternating current output circuit 4 is electrically connected to the battery 1 and is configured to receive the voltage of the battery 1 and output an alternating current supply voltage. The main control circuit 5 is electrically connected to the battery 1, the charging control circuit 2, the first direct current output circuit 3, and the alternating current output circuit 4 and is configured to: control operations of the charging control circuit 2, the first direct current output circuit 3, and the alternating current output circuit 4 and detect at least one of the first direct current output circuit 3 and the alternating current output circuit 4 to obtain a load condition of at least one of the first direct current output circuit 3 and the alternating current output circuit 4, wherein when a duration at which at least one of the first direct current output circuit 3 and the alternating current output circuit 4 is in an unloaded state exceeds a preset time value, the main control circuit 5 controls at least one of the first direct current output circuit 3 and the alternating current output circuit 4 to be turned off. Through the above structure, the main control circuit 5 can detect at least one of the first direct current output circuit 3 and the alternating current output circuit 4 to obtain the load condition of at least one of the first direct current output circuit 3 and the alternating current output circuit 4. When the duration at which at least one of the first direct current output circuit 3 and the alternating current output circuit 4 is in the unloaded state exceeds the preset time value, the main control circuit 5 controls at least one of the first direct current output circuit 3 and the alternating current output circuit 4 to be turned off, thereby solving the problem of high power consumption if the alternating current output circuit 4 and the first direct current output circuit 3 in the energy storage power supply are in the unloaded state. The main control circuit of the energy storage power supply can precisely monitor and control energy consumptions of different modules and cancel a mechanical switch to achieve low-power operation, which prolongs the service life of the entire power supply and achieve a better use experience.

In this embodiment, the main control circuit 5 is configured to detect the first direct current output circuit 3 and the alternating current output circuit 4 to obtain a load condition of the first direct current output circuit 3 and a load condition of the alternating current output circuit 4; the preset time value includes a first preset time value; when a duration at which the alternating current output circuit 4 is in an unloaded state exceeds the first preset time value, the main control circuit 5 controls the alternating current output circuit 4 to be turned off; the preset time value includes a second preset time value; and when a duration at which the first direct current output circuit 3 is in an unloaded state exceeds the second preset time value, the main control circuit 5 controls the first direct current output circuit 3 to be turned off. The first preset time value can be 3 s, 4 s, or another time value. Specifically, when the duration at which the alternating current output circuit 4 is in the unloaded state is greater than 3 s, the main control circuit 5 controls the alternating current output circuit 4 to be turned off. The first preset time value can also be 4 s. Specifically, when the duration at which the alternating current output circuit 4 is in the unloaded state is greater than 4 s, the main control circuit 5 controls the alternating current output circuit 4 to be turned off. The second preset time value can be 3 s, 4 s, or another time value. Specifically, when the duration at which the first direct current output circuit 3 is in the unloaded state is greater than 3 s, the main control circuit 5 controls the first direct current output circuit 3 to be turned off. The second preset time value can also be 4 s. Specifically, when the duration at which the first direct current output circuit 3 is in the unloaded state is greater than 4 s, the main control circuit controls the first direct current output circuit 3 to be turned off. Through the above structure, the preset time value can be decreased, so that the main control circuit 5 can quickly detect the load condition of the first direct current output circuit 3 and the load condition of the alternating current output circuit 4.

In this embodiment, the driving circuit of the energy storage power supply further includes a second direct current output circuit 6; the second direct current output circuit 6 is electrically connected to the battery 1 and is configured to: receive the voltage of the battery 1 and output a second direct current voltage. The first direct current voltage is different from the second direct current voltage. For example, the first direct current voltage and the second direct current voltage may be respectively 5 V and 12 V. The main control circuit 5 is further configured to: control an operation of the second direct current output circuit 6 and detect the second direct current output circuit 6 to obtain a load condition of the second direct current output circuit 6; and when a duration at the second direct current output circuit 6 in an unloaded state exceeds a third preset time value, the main control circuit 5 controls the second direct current output circuit 6 to be turned off. The third preset time value can be 3 s, 4 s, or another time value. Specifically, when the duration at which the second direct current output circuit 6 is in the unloaded state is greater than 3 s, the main control circuit 5 controls the second direct current output circuit 6 to be turned off. The second preset time value can also be 4 s. Specifically, when the duration at which the second direct current output circuit 6 is in the unloaded state is greater than 4 s, the main control circuit 5 controls the second direct current output circuit 6 to be turned off. Through the above structure, the preset time value can be decreased, so that the main control circuit 5 can quickly detect the load condition of the second direct current output circuit 6.

In this embodiment, the alternating current output circuit 4 is configured to: receive the voltage of the battery 1 and convert the voltage of the battery 1 into the alternating current output voltage; the first direct current output circuit 3 is configured to: receive the voltage of the battery 1 and convert the voltage of the battery 1 into the first direct current voltage; and the second direct current output circuit 6 is configured to receive the voltage of the battery 1 and convert the voltage of the battery 1 into the second direct current voltage.

In this embodiment, the alternating current output circuit 4 includes an alternating current conversion module 41 and an alternating current output port 42; the alternating current conversion module 41 is configured to: receive the voltage of the battery 1 and output the alternating current supply voltage; the alternating current output port 42 is configured to output the alternating current supply voltage; the alternating current supply voltage is 110 V or 220 V; the first direct current output circuit 3 includes a first direct current conversion module 31 and a first direct current output port 32; the first direct current conversion module 31 is configured to convert the voltage of the battery 1 into the first direct current voltage; the first direct current output port 32 is configured to output the first direct current voltage; the first direct current voltage is 5 V; the first direct current output port 32 is a USB port; the second direct current output circuit 6 includes a second direct current conversion module 61 and a second direct current output port 62; the second direct current conversion module 61 is configured to convert the voltage of the battery 1 into the second direct current voltage; the second direct current output port 62 is configured to output the second direct current voltage; and the second direct current voltage is 12 V. Through the above structure, the voltage of battery 1 is 16 V. Specifically, the alternating current conversion module 41 receives and converts the 16 V voltage of the battery into the 110 V or 220 V alternating current voltage. Further, the 110 V or 220 V alternating current voltage can be output through the alternating current output port 42. The 110 V alternating current voltage can be applicable to standard voltages in countries such as the United States, Canada, and Mexico and some low-power electrical appliances such as radios and lamps. The 220 V alternating current voltage is applicable to standard voltages in countries such as China, the UK, and France and high-power electrical appliances such as washing machines and air conditioners. The first direct current conversion module receives and converts the 16 V voltage of the battery into a 5 V direct current voltage. Further, the 5 V direct current voltage can be output through the first direct current output port 32. The first direct current output port 32 is a USB port that can provide power transmission for electronic devices such as a mobile phone, a mouse, and a keyboard. The second direct current conversion module 61 receives and converts the 16 V voltage of the battery into a 12 V direct current voltage. Further, the 12 V direct current voltage can be output through the second direct current output port 62, which can provide power for low-power electronic devices such as a navigator and a charger.

In this embodiment, the driving circuit of the energy storage power supply includes a first sampling circuit 7; the first sampling circuit 7 is electrically connected to the main control circuit 5 and the alternating current output circuit 4; the main control circuit 5 detects the alternating current output circuit 4 through the first sampling circuit 7 and obtains a first sampled signal; the main control circuit 5 obtains output power of the alternating current output circuit 4 according to the first sampled signal; when the output power of the alternating current output circuit 4 is less than a first preset power value, the alternating current output circuit 4 is in the unloaded state; and when the duration of the unloaded state exceeds the first preset time value, the alternating current output circuit 4 is controlled to be turned off. The first preset power value can be 50 W or another value. For example, when the first sampling circuit 7 obtains the first sampled signal by detecting the alternating current output circuit 4, the main control circuit 5 may obtain the output power of the alternating current output circuit 4 according to the first sampled signal; when the power of the alternating current output circuit 4 is less than 50 W, the alternating current output circuit 4 is in the unloaded state; when the duration of the unloaded state exceeds the first preset time value, the alternating current output circuit 4 is controlled to be turned off. Through the above structure, it effectively achieves that the main control circuit 5 controls the alternating current output circuit 4 to be turned off through the first sampling circuit 7.

In this embodiment, the driving circuit of the energy storage power supply includes a second sampling circuit 8; the second sampling circuit 8 is electrically connected to the main control circuit 5 and the first direct current output circuit 3; the main control circuit 5 detects the first direct current output circuit 3 through the second sampling circuit 8 and obtains a second sampled signal; the main control circuit 5 obtains output power of the first direct current output circuit 3 according to the second sampled signal; when the output power of the first direct current output circuit 3 is less than a second preset power value, the first direct current output circuit 3 is in the unloaded state; and when the duration of the unloaded state exceeds the second preset time value, the first direct current output circuit 3 is controlled to be turned off. The second preset power value can be 10 W or another value. For example, when the second sampling circuit 8 obtains the second sampled signal by detecting the first direct current output circuit 3, the main control circuit 5 may obtain the output power of the first direct current output circuit 3 according to the second sampled signal; when the power of the first direct current output circuit 3 is less than 10 W, the first direct current output circuit 3 is in the unloaded state; when the duration of the unloaded state exceeds the second preset time value, the first direct current output circuit 3 is controlled to be turned off. Through the above structure, it effectively achieves that the main control circuit 5 controls the first direct current output circuit 3 to be turned off through the second sampling circuit.

In this embodiment, the driving circuit of the energy storage power supply includes a third sampling circuit 9; the third sampling circuit 9 is electrically connected to the main control circuit 5 and the second direct current output circuit 6; the main control circuit 5 detects the second direct current output circuit 6 through the third sampling circuit 9 and obtains a third sampled signal; the main control circuit 5 obtains output power of the second direct current output circuit 6 according to the third sampled signal; when the output power of the second direct current output circuit 6 is less than a third preset power value, the second direct current output circuit 6 is in the unloaded state; and when the duration of the unloaded state exceeds the third preset time value, the second direct current output circuit 6 is controlled to be turned off. The third preset power value can be 15 W or another value. For example, when the third sampling circuit 9 obtains the third sampled signal by detecting the second direct current output circuit 6, the main control circuit 5 may obtain the output power of the second direct current output circuit 6 according to the third sampled signal; when the power of the second direct current output circuit 6 is less than 15 W, the second direct current output circuit 6 is in the unloaded state; when the duration of the unloaded state exceeds the second preset time value, the second direct current output circuit 6 is controlled to be turned off. Through the above structure, it effectively achieves that the main control circuit 5 controls the second direct current output circuit 6 to be turned off through the second sampling circuit 8.

In this embodiment, a quantity of the first direct current output port 32 is multiple; a quantity of the second sampling circuit 8 corresponds to the quantity of first direct current output port 32; each of the second sampling circuits 8 is connected between the corresponding first direct current output port 32 and the main control circuit 5; the main control circuit 5 is configured to detect the load conditions of the plurality of first direct current output ports 32 through the plurality of second sampling circuits 8; when any one of the first direct current output ports 32 is in a loaded state, the main control circuit 5 controls the first direct current output circuit 3 to operate normally; and when all the first direct current output ports 32 are in the unloaded state, the main control circuit 5 controls the first direct current output circuit 3 to be turned off. There are three first direct current output ports 32. Further, the first direct current output ports 32 are USBA1, USBA2, and USBA3. Correspondingly, there are three second sampling circuits 8. The second sampling circuits 8ares USB-AD1, USB-AD2, and USB-AD3.

Specifically, the USB-AD1 is connected between the USBA1 and the main control circuit; the USB-AD2 is connected between the USBA2 and the main control circuit; and the USB-AD3 is connected between the USBA3 and the main control circuit. When the USBA1, the USBA2, or the USBA3 is in the loaded state, the main control circuit 5 controls the first direct current output circuit 3 to operate normally. When the three output ports USBA1, USBA2, and USBA3 are simultaneously in the unloaded state, the main control circuit controls the first direct current output circuit 3 to be turned off. Through the above structure, the three USB output ports can be arranged to simultaneously charge a plurality of sets of equipment, which improves the charging efficiency and convenience. When any USB output port is in the loaded state, the first direct current output circuit 3 will operate normally, which ensures the stability of the output ports.

In this embodiments, the first direct current output circuit 3 further includes a first switch 33; the first switch 33 includes a first control end 331, a first conducting end 332, and a first ground end 333; the main control circuit 5 is electrically connected to the first control end 331; the first direct current conversion module 31 and the first direct current output ports 32 are all electrically connected to the first conducting end 332; the first ground end 333 is electrically connected to a ground; and the first switch 33 is configured to control conversion of the first direct current conversion module 31 and outputs of the first direct current output ports 32. The first switch 33 is a first NPN type transistor; the first control end 331 can be configured to control on/off of a circuit in the main control circuit; the first conducting end 332 can be configured to output a current to the first direct current conversion module 31 and the first direct current output ports 32; and the first ground end 333 can be connected to the ground. Through the above structure, the stability of the circuit can be improved.

In this embodiment, the second sampling circuit 8 includes a plurality of second sampling resistor groups 81; the main control circuit 5 detects the first direct current output circuit 3 and obtains the second sampled signal through the second sampling resistor groups 81; and the main control circuit 5 is configured to control, according to the detected second sampled signal, the first switch 33 to be turned on or turned off. There are three second sampling resistor groups 81, including: a sampling resistor group USBA1, a sampling resistor group USBA2, and a sampling resistor group USBA3. Further, the sampling resistor group USBA1 includes a resistor R1 and a resistor R2; the resistor R1 is connected to the main control circuit; the resistor R2 is connected to the ground; and the resistor R1 and the resistor R2 are both connected to the USBA1. The sampling resistor group USBA2 includes a resistor R3 and a resistor R4; the resistor R3 is connected to the main control circuit; the resistor R4 is connected to the ground; and the resistor R3 and the resistor R4 are both connected to the USBA2. The sampling resistor group USBA3 includes a resistor R5 and a resistor R6; the resistor R5 is connected to the main control circuit 5; the resistor R6 is connected to the ground; and the resistor R5 and the resistor R6 are both connected to the USBA3.

In this embodiment, the second direct current output circuit 6 includes a second switch 63; the second switch includes a second control end 631, a second conducting end 632, and a second ground end 633; the main control circuit 5 is electrically connected to the second control end 631; the second direct current conversion module 61 and the second direct current output port 62 are both electrically connected to the second conducting end 632; the second ground end 633 is electrically connected to the ground; and the second switch 63 is configured to control conversion of the second direct current conversion module 61 and an output of the second direct current output port 62. The second switch 63 is a second NPN type transistor; the second control end 631 can be configured to control on/off of a circuit in the main control circuit 5; the second conducting end 632 can be configured to output a current to the second direct current conversion module 61 and the second direct current output port 62; and the second ground end 633 can be connected to the ground. Through the above structure, the stability of the circuit can be improved.

In this embodiment, the third sampling circuit 9 includes a third sampling resistor group 91; the main control circuit 5 detects the second direct current output circuit 6 and obtains the third sampled signal through the third sampling resistor group 91; and the main control circuit 5 is configured to control, according to the detected third sampled signal, the second switch 63 to be turned on or turned off. The third sampling resistor group 91 includes a resistor R7 and a resistor R8; the resistor R7 is connected to the main control circuit 5; the resistor R8 is connected to the ground; and the resistor R7 and the resistor R8 are both connected to the second direct current output port 62.

In this embodiment, the alternating current output circuit 4 further includes a third switch 43; the third switch 43 includes a first control end 431, a third conducting end 432, and a third ground end 433 the main control circuit 5 is electrically connected to the third control end 431; the alternating current conversion module 41 and the alternating current output port 42 are both electrically connected to the third conducting end 432; the third ground end 433 is electrically connected to the ground; and the third switch 43 is configured to control conversion of the alternating current conversion module 41 and an output of the alternating current output port 42. The third switch 43 is a third NPN type transistor; the third control end 431 can be configured to control on/off of a circuit in the main control circuit 5; the third conducting end 432 can be configured to output a current to the third direct current conversion module 41 and the third direct current output port 42; and the third ground end 433 can be connected to the ground. Through the above structure, the stability of the circuit can be improved.

In this embodiment, the first sampling circuit 7 includes a first sampling resistor group 71; the main control circuit 5 detects the alternating current output circuit 4 and obtains the first sampled signal through the first sampling resistor group 71; and the main control circuit 5 is configured to control, according to the detected first sampled signal, the third switch 43 to be turned on or turned off.

In this embodiment, the charging control circuit 2 includes a first charging port 211, a first charging detection module 212, a second charging port 221, a second charging detection module 222, and a charging control module 21; the external voltage includes a first external voltage and a second external voltage; the first charging port 211 is configured to receive the first external voltage; the first charging detection module 212 is connected between the first charging port 211 and the charging control module 21; the second charging port 221 is configured to receive the second external voltage; the second charging detection module 222 is connected between the second charging port 221 and the charging control module 21; the charging control module 21 is electrically connected to the main control circuit 5 and the battery 1 to charge the battery 1 through the first external voltage or the second direct current voltage; the first charging port 211 is a direct current charging port; the first external voltage is 12 V; the second charging port 221 is a Type-C charging port; and the second external voltage is 5 V. Through the above structure, when the first charging port 211 receives the first external voltage of 12 V, the first charging detection module 212 detects the input voltage and transmits the same to the charging control module 21 to charge the battery 1. When the second charging port 221 receives the second external voltage of 5 V, the second charging detection module 222 detects the input voltage and transmits the same to the charging control module 21 to charge the battery. The existence of the second charging detection module 222 effectively achieves a function of detecting input power and transmitting the same to the charging control module 21.

In this embodiment, the driving circuit of the energy storage power supply further includes a lighting module; and the lighting module is electrically connected to the main control circuit 5 and is configured to emit lighting light under the control of the main control circuit 5. The driving circuit of the energy storage power supply further includes an on/off control module 51; the on/off control module 51 is electrically connected to the main control circuit 5 and is operated by a user to control on and off states of the driving circuit, the lighting module, the direct current output circuits, the alternating current output circuit, and the like. The driving circuit of the energy storage power supply further includes an indication module 52; the indication module is electrically connected to the main control circuit 5 and is configured to send an indication signal under the control of the main control circuit 5 to indicate working conditions of the charging control module, the lighting module, the direct current output circuits, and the alternating current output circuit. The driving circuit of the energy storage power supply further includes a protection module 53; the protection module is electrically connected to the main control circuit 5 and is configured to: detect a working state of the driving circuit and output a detected signal to the main control circuit 5; and the main control circuit 5 analyzes, according to the detection signal, whether the driving circuit is in an abnormal working state and controls, when the driving circuit is in the abnormal working state, the driving circuit to be turned off. Through the above structure, the indication module 52 includes two indicator lamps: LED1 and LED2. When the charging control module 21 is in a working state, the energy storage power supply is in a charging mode, and the LED1 is turned on. When the lighting module, the direct current output circuits, and the alternating current output circuit are in working states, the energy storage power supply is in a discharging mode, and the LED2 is turned on. The arrangement of the indicator lamps can visually indicate a working condition of the energy storage power supply, making it convenient for the user and an operator to understand an operating situation. The protection module 53 is connected to positive and negative electrodes of the battery. When the driving circuit is under an overvoltage or overcurrent, or is overheated, the protection module 53 will control the driving circuit to be turned off to protect the energy storage power supply, which effectively protects the performance safety of the energy storage power supply and prolongs the service life of the energy storage power supply.

In this embodiment, the lighting module 54 includes a fourth switch 55, a lighting conversion module 56, and the lighting device 57; the fourth switch includes a fourth control end 551, a fourth conducting end 552, and a fourth ground end 553; the main control circuit 5 is electrically connected to the fourth control end 551; the lighting conversion module 56 and the lighting device 57 are both electrically connected to the fourth conducting end 552; the fourth ground end 553 is electrically connected to the ground; and the fourth switch 55 is configured to control conversion of the lighting conversion module 56 and lighting of the lighting device 57. The fourth switch 55 is a fourth NPN type transistor; the fourth control end 551 can be configured to control on/off of a circuit in the main control circuit 5; the fourth conducting end 552 can be configured to output a current to the lighting conversion module 56 and the lighting device 57; and the fourth ground end 553 can be connected to the ground. Through the above structure, the stability of the circuit can be improved.

In this embodiment, the on/off control module 51 includes a first button 511, a second button 512, a third button 513, a fourth button 514, a fifth button 515, and a sixth button 516; the first button 511 is configured to control on and off states of the driving circuit; the second button 512 is configured to control on and off states of the first direct current output circuit; the third button 513 is configured to control on and off states of the second direct current output circuit; the fourth button 514 is configured to control on and off states of the alternating current output circuit; the fifth button 515 is configured to control on and off states of the lighting module; and the sixth button 516 is configured to control on and off states of the charging control circuit 2. The first button 511 is connected to the main control circuit 5 to control turning on and turning off of the charging control circuit 2; the second button 512 is connected to the main control circuit 5 to control turning on and turning off of the alternating current output circuit 4; the third button 513 is connected to the main control circuit 5 to control turning on and turning off of the first direct current output circuit 3; the fourth button 514 is connected to the main control circuit 5 to control turning on and turning off of the second direct current output circuit 6; the fifth button 515 is connected to the main control circuit 5 to control turning on and turning off of the lighting module 54; and the sixth button 516 is connected to the main control circuit 5 to control turning on and turning off of the indication module 52. Through the above structure, all the modules of the energy storage power supply are provided with the corresponding switch buttons, which facilitates quickly cutting off the power of the corresponding modules in emergency cases, and it is convenient for the user to control and manage each module.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. An energy storage power supply, comprising:
a shell, wherein the shell is provided with a lighting chamber, and the lighting chamber is provided with a first light outlet; and
a lighting device, wherein the lighting device comprises a light-emitting component and a condensing lens; the lighting device is arranged in the lighting chamber; a light-emitting surface of the light-emitting component is arranged in a manner of facing the condensing lens and the first light outlet; and the condensing lens is configured to condense light emitted by the light-emitting component to form a light beam;
wherein the energy storage power supply further comprises a driving circuit of the energy storage power supply; the driving circuit of the energy storage power supply comprises: a charging control circuit, configured to be electrically connected to an external power supply and a battery to receive an external voltage to charge the battery; a first direct current output circuit, electrically connected to the battery and configured to receive a voltage of the battery and output a first direct current voltage; an alternating current output circuit, electrically connected to the battery and configured to receive the voltage of the battery and output an alternating current supply voltage; and a main control circuit, electrically connected to the battery, the charging control circuit, the first direct current output circuit, and the alternating current output circuit and configured to: control operations of the charging control circuit, the first direct current output circuit, and the alternating current output circuit and detect at least one of the first direct current output circuit and the alternating current output circuit to obtain a load condition of at least one of the first direct current output circuit and the alternating current output circuit, wherein when a duration at which at least one of the first direct current output circuit and the alternating current output circuit is in an unloaded state exceeds a preset time value, the main control circuit controls at least one of the first direct current output circuit and the alternating current output circuit to be turned off;
the main control circuit is configured to detect the first direct current output circuit and the alternating current output circuit to obtain a load condition of the first direct current output circuit and a load condition of the alternating current output circuit; the preset time value comprises a first preset time value; when a duration at which the alternating current output circuit is in an unloaded state exceeds the first preset time value, the main control circuit controls the alternating current output circuit to be turned off; the preset time value comprises a second preset time value; and when a duration at which the first direct current output circuit is in an unloaded state exceeds the second preset time value, the main control circuit controls the first direct current output circuit to be turned off;
wherein the driving circuit of the energy storage power supply further comprises a second direct current output circuit; the second direct current output circuit is electrically connected to the battery and configured to: receive the voltage of the battery and output a second direct current voltage; the first direct current voltage is different from the second direct current voltage; the main control circuit is further configured to: control an operation of the second direct current output circuit and detect the second direct current output circuit to obtain a load condition of the second direct current output circuit; and when a duration at the second direct current output circuit in an unloaded state exceeds a third preset time value, the main control circuit controls the second direct current output circuit to be turned off;
the alternating current output circuit is configured to: receive the voltage of the battery and convert the voltage of the battery into the alternating current output voltage; the first direct current output circuit is configured to: receive the voltage of the battery and convert the voltage of the battery into the first direct current voltage; the second direct current output circuit is configured to receive the voltage of the battery and convert the voltage of the battery into the second direct current voltage;
the alternating current output circuit comprises an alternating current conversion module and an alternating current output port; the alternating current conversion module is configured to: receive the voltage of the battery and output the alternating current supply voltage; the alternating current output port is configured to output the alternating current supply voltage; the alternating current supply voltage is 110 V or 220 V; the first direct current output circuit comprises a first direct current conversion module and a first direct current output port; the first direct current conversion module is configured to convert the voltage of the battery into the first direct current voltage; the first direct current output port is configured to output the first direct current voltage; the first direct current voltage is 5 V; the second direct current output circuit comprises a second direct current conversion module and a second direct current output port; the second direct current conversion module is configured to convert the voltage of the battery into the second direct current voltage; the second direct current output port is configured to output the second direct current voltage; and the second direct current voltage is 12 V;
wherein the driving circuit of the energy storage power supply comprises a first sampling circuit; the first sampling circuit is electrically connected to the main control circuit and the alternating current output circuit; the main control circuit detects the alternating current output circuit through the first sampling circuit and obtains a first sampled signal; the main control circuit obtains output power of the alternating current output circuit according to the first sampled signal; when the output power of the alternating current output circuit is less than a first preset power value, the alternating current output circuit is in the unloaded state; when the duration of the unloaded state exceeds the first preset time value, the alternating current output circuit is controlled to be turned off;

the driving circuit of the energy storage power supply comprises a second sampling circuit; the second sampling circuit is electrically connected to the main control circuit and the first direct current output circuit; the main control circuit detects the first direct current output circuit through the second sampling circuit and obtains a second sampled signal; the main control circuit obtains output power of the first direct current output circuit according to the second sampled signal; when the output power of the first direct current output circuit is less than a second preset power value, the first direct current output circuit is in the unloaded state; when the duration of the unloaded state exceeds the second preset time value, the first direct current output circuit is controlled to be turned off;

the driving circuit of the energy storage power supply comprises a third sampling circuit; the third sampling circuit is electrically connected to the main control circuit and the second direct current output circuit; the main control circuit detects the second direct current output circuit through the third sampling circuit and obtains a third sampled signal; the main control circuit obtains output power of the second direct current output circuit according to the third sampled signal; when the output power of the second direct current output circuit is less than a third preset power value, the second direct current output circuit is in the unloaded state; and when the duration of the unloaded state exceeds the third preset time value, the second direct current output circuit is controlled to be turned off, wherein a quantity of the first direct current output port is multiple; a quantity of the second sampling circuit corresponds to the quantity of first direct current output port; each of the second sampling circuits is connected between the corresponding first direct current output port and the main control circuit; the main control circuit is configured to detect the load conditions of the plurality of first direct current output ports through the plurality of second sampling circuits; when any one of the first direct current output ports is in a loaded state, the main control circuit controls the first direct current output circuit to operate normally; and when all the first direct current output ports are in the unloaded state, the main control circuit controls the first direct current output circuit to be turned off;

wherein the first direct current output circuit further comprises a first switch; the first switch comprises a first control end, a first conducting end, and a first ground end; the main control circuit is electrically connected to the first control end; the first direct current conversion module and the first direct current output ports are all electrically connected to the first conducting end; the first ground end is electrically connected to a ground; the first switch is configured to control conversion of the first direct current conversion module and outputs of the first direct current output ports;

the second sampling circuit comprises a plurality of second sampling resistor groups; the main control circuit detects the first direct current output circuit and obtains the second sampled signal through the second sampling resistor groups; the main control circuit is configured to control, according to the detected second sampled signal, the first switch to be turned on or turned off;

the second direct current output circuit comprises a second switch; the second switch comprises a second control end, a second conducting end, and a second ground end; the main control circuit is electrically connected to the second control end; the second direct current conversion module and the second direct current output port are both electrically connected to the second conducting end; the second ground end is electrically connected to the ground; the second switch is configured to control conversion of the second direct current conversion module and an output of the second direct current output port;

the third sampling circuit comprises a third sampling resistor group; the main control circuit detects the second direct current output circuit and obtains the third sampled signal through the third sampling resistor group; the main control circuit is configured to control, according to the detected third sampled signal, the second switch to be turned on or turned off, the alternating current output circuit further comprises a third switch; the third switch comprises a first control end, a third conducting end, and a third ground end; the main control circuit is electrically connected to the third control end; the alternating current conversion module and the alternating current output port are both electrically connected to the third conducting end; the third ground end is electrically connected to the ground; the third switch is configured to control conversion of the alternating current conversion module and an output of the alternating current output port;

the first sampling circuit comprises a first sampling resistor group; the main control circuit detects the alternating current output circuit and obtains the first sampled signal through the first sampling resistor group; and the main control circuit is configured to control, according to the detected first sampled signal, the third switch to be turned on or turned off.

2. The energy storage power supply according to claim 1, wherein the charging control circuit comprises a first charging port, a first charging detection module, a second charging port, a second charging detection module, and a charging control module; the external voltage comprises a first external voltage and a second external voltage; the first charging port is configured to receive the first external voltage; the first charging detection module is connected between the first charging port and the charging control module; the second charging port is configured to receive the second external voltage; the second charging detection module is connected between the second charging port and the charging control module; the charging control module is electrically connected to the main control circuit and the battery to charge the battery through the first external voltage or the second direct current voltage; the first charging port is a direct current charging port; the first external voltage is 12 V; the second charging port is a Type-C charging port; and the second external voltage is 5 V.

3. The energy storage power supply according to claim 2, wherein the driving circuit of the energy storage power supply further comprises a lighting module; the lighting module is electrically connected to the main control circuit and is configured to emit lighting light under the control of the main control circuit; the driving circuit of the energy storage power supply further comprises an on/off control module; the on/off control module is electrically connected to the main control circuit and is operated by a user to control on and off states of the driving circuit, the lighting module, the direct current output circuits, the alternating current output circuit, and the like; the driving circuit of the energy storage power supply further comprises an indication module; the indication module is electrically connected to the main control circuit and is configured to send an indication signal under the control of the main control circuit to indicate working conditions of the charging control module, the lighting module, the direct current output circuits, and the alternating current output circuit; the driving circuit of the energy storage power supply further comprises a protection module; the protection module is electrically connected to the main control circuit and is configured to: detect a working state of the driving circuit and output a detected signal to the main control circuit; and the main control circuit analyzes, according to the detection signal, whether the driving circuit is in an abnormal working state and controls, when the driving circuit is in the abnormal working state, the driving circuit to be turned off.

4. The energy storage power supply according to claim 3, wherein the lighting module comprises a fourth switch, a lighting conversion module, and the lighting device; the fourth switch comprises a fourth control end, a fourth conducting end, and a fourth ground end; the main control circuit is electrically connected to the fourth control end; the lighting conversion module and the lighting device are both electrically connected to the fourth conducting end; the fourth ground end is electrically connected to the ground; the fourth switch is configured to control conversion of the lighting conversion module and lighting of the lighting device;

the on/off control module comprises a first button, a second button, a third button, a fourth button, a fifth button, and a sixth button; the first button is configured to control on and off states of the driving circuit; the second button is configured to control on and off states of the first direct current output circuit; the third button is configured to control on and off states of the second direct current output circuit; the fourth button is configured to control on and off states of the alternating current output circuit; the fifth button is configured to control on and off states of the lighting module; and the sixth button is configured to control on and off states of the charging control circuit.

* * * * *